Jan. 5, 1932.   R. M. LOVEJOY   1,839,569
ADJUSTABLE MACHINE TOOL
Filed March 20, 1929
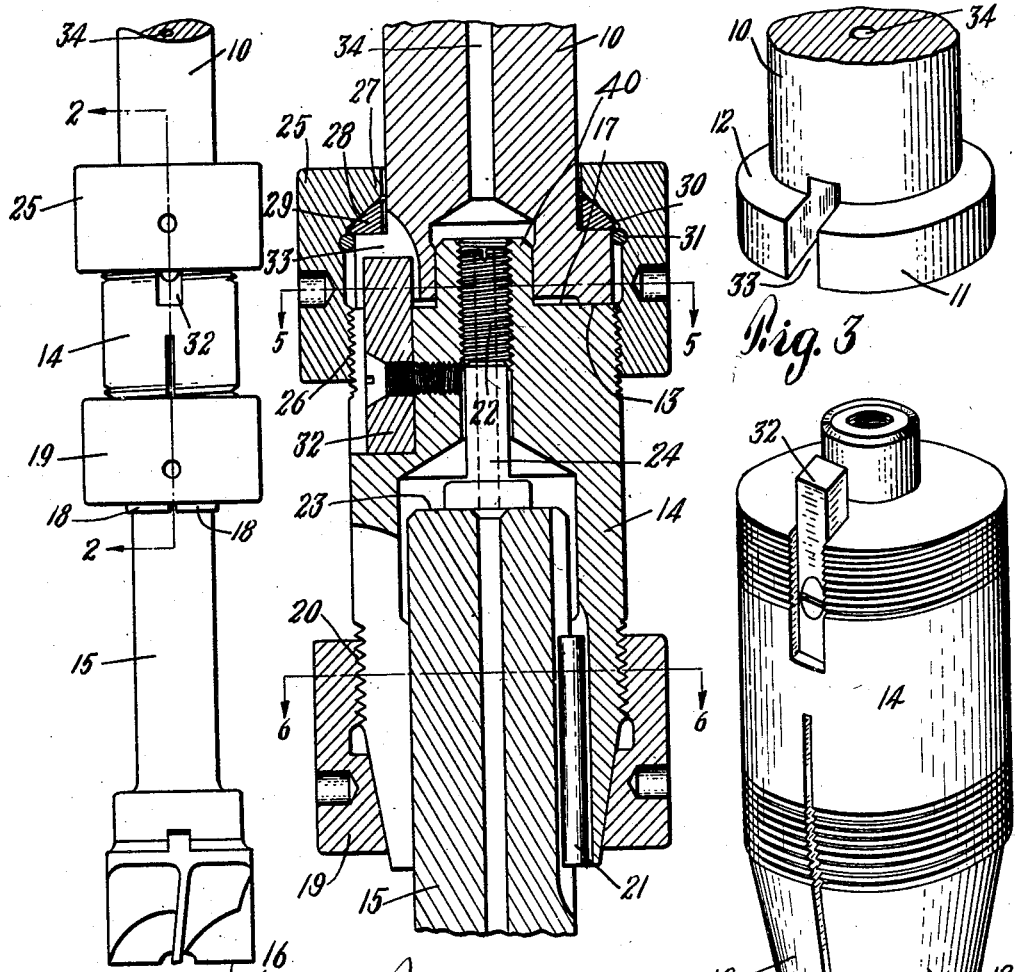
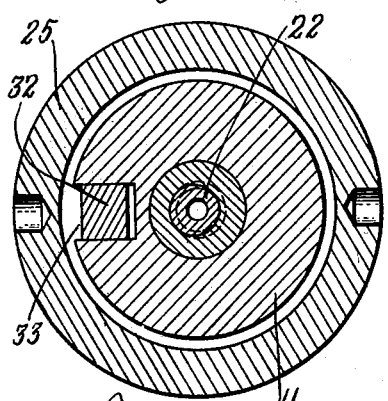
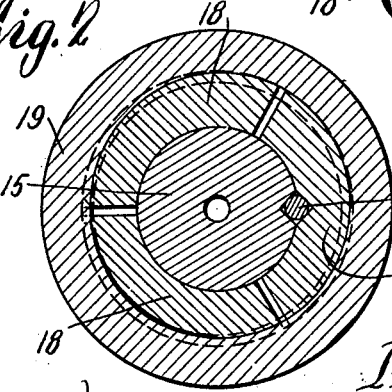
Inventor:
Ralph M. Lovejoy.

Patented Jan. 5, 1932

1,839,569

UNITED STATES PATENT OFFICE

RALPH M. LOVEJOY, OF BOSTON, MASSACHUSETTS

ADJUSTABLE MACHINE TOOL

Application filed March 20, 1929. Serial No. 348,613.

This invention relates to a tool of adjustable overall length, to means for securing the tool to a spindle of an automatic machine or the like, and to a method of using the tool in conjunction with the machine.

In metal-working machines which are largely or wholly automatic in their operation, it is frequently necessary for one or more of the tools to advance a definite predetermined distance into the work. In the case of a drilling tool, for example, which may be mounted on a rotatable spindle, the spacial relation between the spindle and the work-holder may be made relatively constant by suitably rigid framework supporting the spindle and work-holder. Thus, any desired spacial relation between the tool and the work may be established for successive pieces of work by securing such pieces successively in a uniform manner in the workholder, and by securing the tool to the spindle in carefully adjusted relation thereto. One practical difficulty in the use of automatic metal-working machines arises from the fact that cutting tools soon lose their edge and unless frequently replaced by sharpened tools, produce inferior work. Since the grinding of a dulled tool to restore its edge entails a removal of a portion of the material and results in a slight shortening of the tool, it has been necessary when inserting a sharpened tool in a machine to adjust it carefully to the spindle so that it will cut just the correct distance in the work. Such adjustment necessitates the exercise of considerable skill and involves a considerable loss of time. If the tool is used in a complicated machine performing several operations, the stoppage of the entire machine for such adjustments is a serious matter. It is an object of the invention to facilitate the replacement of a tool in such a machine so that no adjustment will be necessary in making the replacement and the time of stoppage of the machine will be reduced to minimum without the sacrifice of any accuracy in the work. To this end I provide a tool having a reference surface at the end remote from the cutting edge to engage the end of the machine spindle. The tool is also constructed to be of adjustable length from its reference surface to its cutting edge, so that this length may be accurately adjusted in the tool-dressing shop before the tool is attached to the machine spindle. This eliminates the necessity for careful adjustment when the tool is mounted in the machine and thus radically reduces the delays incident to the replacement of tools in the machine. For adjustment of length the tool may comprise two relatively adjustable parts, one of which carries the reference surface while the other carries the cutting edge. Various additional features of structure will be apparent to one skilled in the art from the disclosure of the invention which follows, and on the drawings, of which,—

Figure 1 is an elevation of an embodiment of the invention.

Figure 2 is a section on the line 2—2 of Figure 1.

Figure 3 is an elevated view of a portion of the machine spindle.

Figure 4 is a perspective view of the socket member of the tool shown in Figure 1.

Figure 5 is a section on the line 5—5 of Figure 2.

Figure 6 is a section on the line 6—6 of Figure 2.

Referring to the figures in detail, 10 represents the lower portion of a machine spindle which may be provided with an enlarged portion 11 at its lower end forming a shoulder 12. The end portion 11 terminates in an annular face 13. A machine tool such, for example, as illustrated in Figure 1, may be secured against the face 13 of the machine spindle. As shown, this tool may comprise a socket member 14 and a shank member 15. The socket member and shank member, as shown in Figure 2, are constructed for relative axial adjustment, so that the distance between the cutting end 16 which is on the shank member and the bearing face 17 which is on the socket member 14 at the end of the tool remote from the cutting end may be adjustably varied. In order to clamp the socket member 14 together with the shank member so that the two members act as a single tool, the lower portion of the socket member may be split so as to form a plurality of fingers 18, the lower portion of which is preferably tapered to receive a clamp ring 19. This ring may be in threaded engagement with the socket member as at 20 and is inwardly beveled to ride on the tapered portion of the fingers 18. Thus, when the ring 19 is screwed onto the socket member 14, the fingers 18 are pressed inwardly, and if the shank member 15 has been inserted between the fingers, it will be clamped thereby. In order to prevent relative rotation between the socket member and the shank member, I may notch each of these members to receive a key 21 which may be in the form of a cylindrical pin, so as to facilitate insertion and removal. Since in metalworking there may be considerable axial thrust on the cutting end of the tool, I provide a positive stop to limit the telescoping movement of the socket and shank members so that this stop may definitely establish the length of the tool from the surface 17 to the cutting edge 16. This stop may comprise a set screw 22 threaded into a suitable bore in the upper portion of the socket member 14. This screw 22 may extend downwardly a sufficient distance to engage the upper end face 23 of the shank member 15, or as shown, a suitable distance piece 24 may be inserted between the lower end of the screw 22 and the end face 23 of the shank member. By rotating the screw 22, the length of the tool, as a whole, from the face 17 to the edge 16 may be adjusted, as desired, to a fine degree of accuracy.

In order to facilitate rapid attachment of the tool to the spindle 10 and to ensure precise alignment of the axes of the spindle 10 and the socket member 14, the latter may be provided at its upper end with a central reduced portion or pilot 40 which is cylindrical in shape and which fits closely in a central recess in the bottom of the spindle 10. This accurately centers the contacting faces 13 and 17 relatively to each other. Accurate directional alignment of the axes is obtained by structure by which the interfacial pressure between the annular face 13 and the face 17 is evenly distributed over the area of contact. This structure may include a clamping ring 25 attached for threaded engagement with the upper portion of the tool as at 26. The ring 25 is provided with an inwardly extending flange 27 having a beveled face 28 which is above the shoulder 12. Between the shoulder 12 and the beveled face 28 I insert a suitable washer 29, the upper sloping face 30 of this washer being rounded so that the washer 29 and the flange 27 form a virtual ball and socket connection. As the clamping ring 25 is tightened on the thread 26, the ball and socket connection allows the ring to adjust itself so as to draw the face of the tool evenly against the end face 13 of the spindle 10. A spring ring 31 may be provided, if desired, within the ring 25 to retain the washer 29 therein when the ring is removed from the spindle 10. A key 32 is preferably mounted on the tool, a portion of this key projecting into a suitable notch 33 in the lower end of the spindle so as to prevent relative rotation between the tool and the spindle. In order to supply a constant stream of oil to the work, the spindle 10 may have a central channel 34, this channel extending downwardly through the center of the set screw 22, the distance piece 24, and the shank member 23.

Whenever a tool of the type described becomes dull so as to necessitate removal for sharpening, a similar tool may be held in readiness to be inserted in its place, this tool having been adjusted so that the distance from its cutting edge 16 to its opposite end face 17 is correct. The dull tool is removed by unscrewing the clamping ring 25 from engagement therewith. The replacing tool may thereupon be quickly held against the lower end of the spindle 10 while the ring 25 is set up thereon, this operation requiring but a few moments and resulting in a clamping of the tool accurately in place. The removed tool may be taken to the tool-dressing shop where the cutting edges 16 may be ground until sufficient sharpness is restored. Overall length of the tool may thereupon be adjusted to compensate for the removal of material from the cutting end of the tool incident to the sharpening of the cutting edges. This adjustment of length may be accomplished by loosening the clamp ring 19, setting up on the set screw 22, then tightening the clamp ring 19 again. The tool is thereupon ready to replace a similar tool in the machine without necessitating fine adjustments when the tool is inserted in the machine. All that is necessary is to remove the dull tool, insert the sharpened tool, and set up on the clamping ring 25, whereupon the tool is at once ready for operation. This results in a great saving of idle time for the machine as a whole.

Having thus described an embodiment of this invention, it should be evident to those skilled in the art that various changes and modifications might be made therein without departing from its spirit or scope as defined by the appended claims.

I claim:

1. In combination with a machine spindle having an end face and a shoulder adjacent thereto, a tool having an end face adapted to fit against the end face of the spindle and a threaded portion adjacent to its end face, and means for clamping said faces together in even engagement, said means comprising a clamping ring having an internally threaded portion for engagement with the threaded portion of the tool and an inwardly extending flange with a beveled face, and a washer having a face engaging said shoulder and a rounded face in rocking engagement with said beveled face, whereby the abutting end faces of the spindle and tool are evenly clamped together.

2. In combination with a machine spindle, a tool attachable to said spindle having a cutting edge, and means for facilitating attachment of the tool to the spindle with the cutting edge accurately located with reference to the spindle, said means including means for adjusting the overall length of the tool prior to attachment to said spindle, means for accurately centering the adjacent ends of the tool and spindle relatively to each other, and means for securing the tool to the spindle with their axes accurately aligned.

3. In combination with a machine spindle having a plane end face and a central cylindrical recess in said face, a tool having a cutting edge at one end thereof, and means for facilitating attachment of said tool to said spindle so that said cutting edge is accurately located with reference to said spindle, said means including a plane face on the end of the tool remote from the cutting edge, a central cylindrical boss projecting from the end face of the tool and adapted to fit into said recess in the spindle, means for clamping said faces together with a substantially even distribution of pressure thereover, and means for accurately adjusting the axial distance between the end face of the tool and the cutting edge prior to the attachment of the tool to the spindle.

4. In combination with a machine spindle, a tool attachable to said spindle having a cutting edge, and means for facilitating the attachment of said tool to said spindle, said means including abutting end faces on said tool and spindle, self-adjusting means for clamping said faces together with an even distribution of pressure thereover, means for accurately centering said faces relatively to each other, and a key sunk into the side of said spindle and tool to lock said spindle and tool against relative rotation.

5. In combination with a machine spindle having a plane end face, a tool attachable to said spindle having a cutting edge and a plane end-face remote from said cutting edge, means for facilitating the attachment of said tool to said spindle with said faces abutting each other, said means being self-adjusting to distribute the interfacial pressure between abutting faces uniformly about the axis of said spindle and tool.

6. In combination with a spindle having a plane end face and a radial flange at an end thereof, a tool having a plane end face and a threaded lateral surface portion, a collar having an inward flange surrounding said spindle above said spindle flange and an internally threaded portion extending outwardly beyond the end of the spindle for threaded engagement with said tool, and a ball-and-socket bearing between the spindle flange and collar flange.

In testimony whereof I have affixed my signature.

RALPH M. LOVEJOY.